United States Patent [19]

Weisbrod

[11] 4,002,957
[45] Jan. 11, 1977

[54] TRIMMABLE FIXED HERMETICALLY SEALED CAPACITOR

[75] Inventor: Marvin A. Weisbrod, Santa Clara, Calif.

[73] Assignee: International Telephone and Telegraph Corporation, New York, N.Y.

[22] Filed: June 18, 1975

[21] Appl. No.: 587,903

[52] U.S. Cl. .............................. 317/245; 317/244; 317/251
[51] Int. Cl.² ......................................... H01G 5/02
[58] Field of Search ................... 317/244, 245, 251

[56] References Cited
UNITED STATES PATENTS

| 2,740,077 | 3/1956 | Clarke .............................. 317/245 |
| 3,543,107 | 11/1970 | Johanson et al. ................... 317/251 |

*Primary Examiner*—E. A. Goldberg
*Attorney, Agent, or Firm*—William T. O'Neil

[57] ABSTRACT

A "fixed" vacuum capacitor assembly in which first and second sets of interleaved, substantially concentric, capacitor plates are held between opposing end-bell assemblies. A trimmer capacitor including third and fourth sets of capacitor plates, an axial leadscrew assembly and a vacuum sealed axially extendable bellows are emplaced substantially coaxially within the first and second capacitor plate assembly. The third and fourth capacitor plates are variably interleavable in accordance with the leadscrew setting and these third and fourth plate sets together with the leadscrew bellows assembly occupy substantially the same axial dimension, between the end-bell assemblies, as is occupied by the first and second plate sets. A hollow cylindrical ceramic insulating body portion joins the two end-bell parts and the substantially smaller trimmer capacitor and the fixed capacitor formed by the interleaved first and second plate sets are electrically in parallel, the end-bells providing the electrical terminals thereof.

8 Claims, 2 Drawing Figures

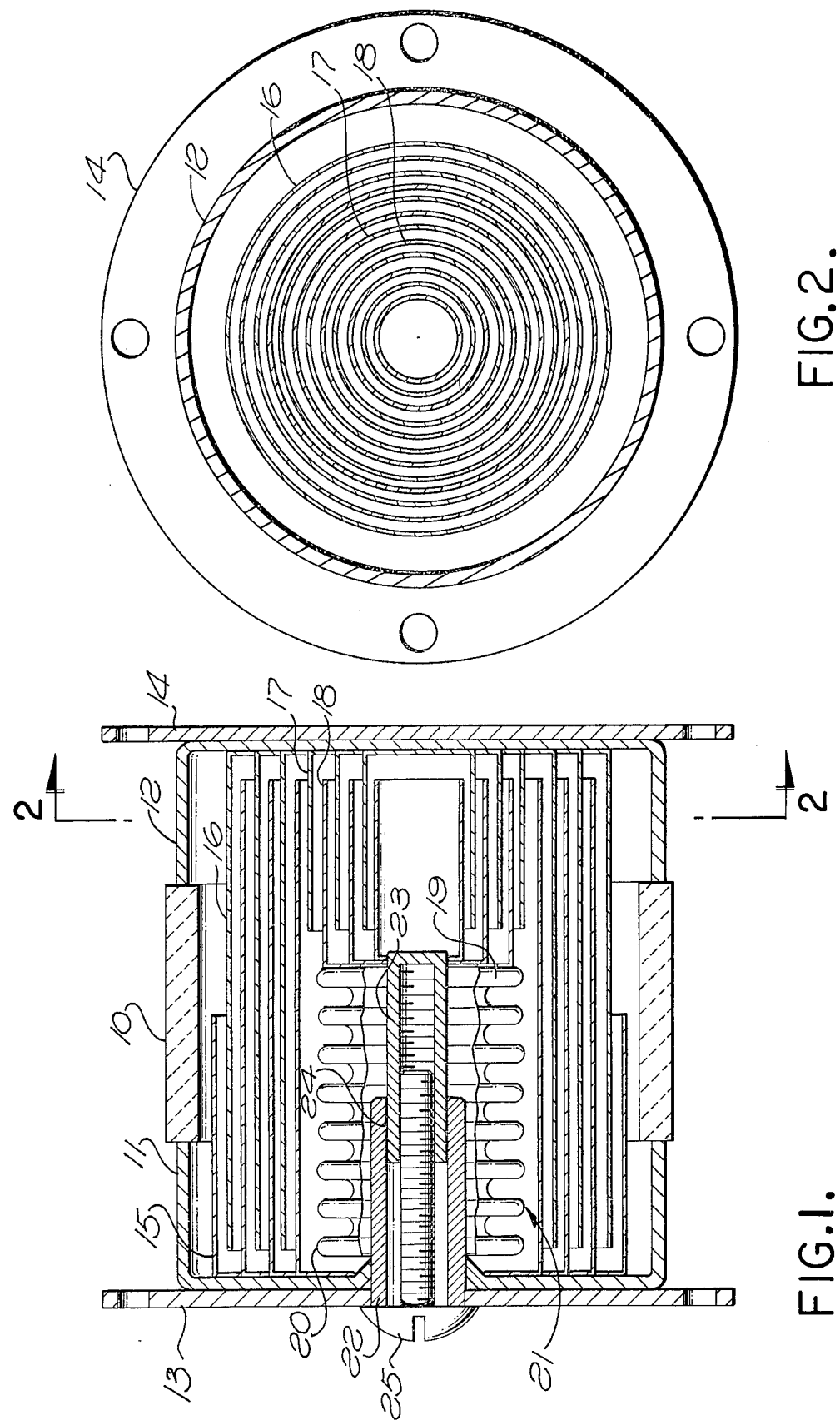

TRIMMABLE FIXED HERMETICALLY SEALED CAPACITOR

BACKGROUND OF THE INVENTION

1. Field of the Invention

This invention relates to vacuum capacitors generally, and more specifically, the present invention elates to a "fixed" vacuum capacitor with an electrically parallel trimmer capacitor internally connected thereto.

2. Description of the Prior Art

Hermetically sealed capacitors, such as vacuum and gas-filled capacitors, have, in the prior art, generally been of the fully variable type such as typically described in U.S. Pat. No. 3,257,590, among others, or of the fully fixed type, such as typically described in U.S. Pat. No. 3,156,852.

There are many applications for radio frequency capacitors in high-powered circuits where the range of variation (tuning or trimming) is relatively small. The use of the fully variable type vacuum capacitor in such applications is relatively uneconomical, both from cost and space utilization points of view. The fully variable vacuum capacitor as known in the prior art must necessarily allow for the relatively large axial translation of the movable plates and must include a relatively large bellows. The latter requirements results from the well-known phenomenon of bellows heating in such devices.

The use of the fixed type vacuum capacitor, while resulting in very good performance and space economy, frequently leaves the designer with the additional problem of circuit trimming or fine tuning. Such fine tuning or trimming is very often necessary in a radio frequency circuit because of the tolerances, not only of the capacitor itself, but of the associated circuit elements. Those skilled in this art will recognize other situations which inherently require relatively small percentage adjustment in the value of capacitance used.

In using the fully fixed capacitor, the need for additional external adjustment is presented, and cost and space advantages obtained through the use of a fixed vacuum capacitor may well be more than offset.

The manner in which the present invention deals with the prior art disadvantages will be evident as this description proceeds.

SUMMARY OF THE INVENTION

In accordance with the disadvantages of prior art devices of the class and type indicated, it may be said to have been the general objective of the present invention to produce a vacuum capacitor assembly including a fixed capacitor providing a large percentage of the total capacitance of the unit but also including means for providing a small amount of trimming or adjustment.

The present invention involves the use of a vacuum enclosure or housing including two metallic end-bells (for example) brazed to a central insulating body section. That particular configuration is, of course, familiar to those skilled in this art. The usual shape of such a housing is cylindrical, and in the combination of the present invention, the fixed capacitors section may extend substantially over the full interior axial dimension, since there is no requirement for changing plate interleaving. This fixed capacitor portion of the combination thus may occupy not only the full axial dimension as indicated, but also may occupy that portion of the housing volume of generally annular cross-sectional shape extending laterally inward from the insulating sidewall portion of the housing for half or more of the housing radius.

The cylinder shaped volume remaining as a "core"-volume extending axially within the housing then contains a sealed bellows of relatively small diameter, an adjustable lead screw within the bellows and engaging the internal end wall thereof, and a smaller set of concentric interleaving capacitor plates. The extent of interleaving of this smaller (trimmer section) is determined by the setting of the aforementioned leadscrew, the movable plates of this secondary set being attached to the said bellows and wall.

Since the first and second sets of plates of the fixed capacitors assembly are respectively connected to the inside surfaces of the end-bells, and since the fixed plate set of the secondary capacitor assembly is also affixed to the end-bell inside surface at one end of the housing, the bellows thus provides a conductive path between the movable plates of the secondary set and the other end bell; the fixed capacitor assembly and the secondary or trimmer capacitor arrangement are then electrically in parallel.

It will be recognized by those skilled in this art that the fixed capacitor assembly provides for the employment of relatively long plate lengths and circumferential plates areas and therefore allows for high capacitance density. The relatively small total capacitance added by the secondary capacitor plate arrangement means that the bulk of the R.F. current flowing through the entire capacitor assembly passes through the fixed capacitor portion. Accordingly, the relatively small amount of current carried by the bellows greatly limits the phenomenon of bellows heating with the result that the smaller size of the bellows is not disadvantageous and its useful life is extended.

From another point of view, it may be said that, for the same order of sealed-in (or evacuated) housing volume, the current carrying capacity of capacitors constructed in accordance with the concepts of the present invention may be much greater than for more conventional prior art fully variable vacuum capacitors.

It follows that the design of capacitors in accordance with the present invention leads to more compact capacitance units of lower cost, in those many applications where the percentage of capacitance variations required is relatively small.

The details of the manner in which the present invention may be constructed and operated will be understood from the description hereinafter.

BRIEF DESCRIPTION OF THE DRAWINGS

FIG. 1 is a sectional view of a typical device in accordance with the present invention, the sectioning plane lying in the plane of the illustration and containing the axial centerline.

FIG. 2 is a cross-sectional view taken orthogonally through FIG. 1, as indicated.

DESCRIPTION OF THE PREFERRED EMBODIMENT

Referring now to FIG. 1, a pair of end-bells 11 and 12 are brazed to a hollow cylindrical insulating ceramic body section 10. These end-bells are normally fabricated of metal having relatively good conductivity, since they do conduct currents passing through the capacitor. A tubular guide member 22 is attached to a hole at the left end of FIG. 1 by brazing or other hermetic sealing method. A flange plate 13 is affixed and may be brazed to the end-bell member 11; the flange plate 13 having a central hole congruent with the aforementioned hole in 11 about the centerline of the device.

Within the internal bore of the tubular guide member 22, an internally threaded elongated tubular member 23 fits slideably such that sliding may occur along the surface of contact 24 in response to the setting of the adjustment screw 25. A metallic bellows 21 is brazed (or otherwise hermetically sealed) to two washer-like members 19 and 20 at the bellows extremities, the said washer-like members 19 and 20 being brazed to the outside diameters of 23 and 22, respectively.

Accordingly, the volume within the housing comprised by end-bells 11 and 12, insulating body section 10, and the bellows assembly may be evacuated in accordance with known techniques for the manufacture of such devices.

The smaller (shorter axially and of much smaller diameter) plate set referred to as a secondary or trimmer capacitor plate set (or assembly) includes a set of fixed plates of which 17 is typical and a set of interleaving moving plates of which 18 is typical. The fixed plates of this set along with the fixed plates, of which 16 is typical, of the larger set are electrically and mechanically secured to the inside of the end-bell member 12. The other (interleaved) plates of the larger fixed set, typically 15, is electrically and mechanically fixed to the inside surface of end-bell member 11. Still further, the leadscrew and associated members, and (more importantly) the bellows 21 and its end wall members provide electrical continuity from the end-bell member 11 to the small set of movable plates, i.e., 18, etc. From this, the fact that the two discrete vacuum capacitors in the structure of FIG. 1 are electrically in parallel will be evident.

It will be realized by those skilled in this art, that the external atmospheric pressure which is manifest within the inside surface of bellows 21, i.e., in the space surrounding the leadscrew and associated members, tends to mechanically bias the bellows end wall 19 to the right, as illustrated in FIG. 1. For this reason, "lost motion" or backlash due to thread mating tolerances between the leadscrew 25 and mating part 23 is substantially eliminated.

As an example of the results achievable in accordance with the present invention, a practical embodiment having 300 pF total capacitance has a fixed capacitance contribution of 275 pF. The variable or trimmer capacitor contribution is approximately 25 pF.

In a situation where the working voltage is 10,000 volts peak, total current carried by the capacitor will be 26.652 amperes RMS at 2 MHz. Of this, the fixed capacitor carries 24.432 amperes RMS and the variable portion carries a maximum of 2.221 amperes RMS. This relatively small amount of current which must be carried by the bellows (i.e., the 2.221 ampere current) permits extended bellows life, since bellows heating even in the relatively small bellows employed, is minimal. Accordingly, the total current carrying capacities of the overall device are much higher than for the more conventional variable vacuum capacitor.

Although vacuum brazing (a form of furnace brazing) is normally contemplated, it will be recognized by those skilled in this art that other methods for effecting the hermetic (hard) sealing between the bellows and associated parts and for affixing the plates to their respective support members can be used. Such other methods include heliarc welding, etc. Although this specification speaks primarily of vacuum capacitors, essentially the same device can also be constructed as a gas-filled capacitor.

One common method of constructing plates of the types illustrated and described involves fabrication as individual "cups", fit inside each other to form this symmetrical assembly. Other methods of forming the plates are also well known in this art. Although the cross-sectional shape of all of the plates of the device described would normally be circular, the inventive concept of the present invention does not require that they be in this shape. For greatest efficiency and manufacturing ease, it is normal to form these plates in a circumferentially continuous surface, although this too, is not required by the inventive concept.

In addition to the various brazing and welding techniques applicable to the assembly of the present device, it is also noted that the process for joining metallic members, such as the end-bells 11 and 12 to the hollow cylindrical ceramic body member 10 to provide hermetic sealing thereat is well known. This includes the process of preparing the ceramic surfaces to permit adherence by the brazing material.

Other modifications and variations will suggest themselves to those skilled in this art once the inventive concepts are understood. Accordingly, it is not intended that the scope of the present invention should be limited to the embodiment illustrated and described. The drawings are to be considered illustrative and typical only.

What is claimed is:
1. A hermetically sealed capacitor assembly comprising:
   a sealed housing having generally opposite end walls;
   first means providing a pair of electrical terminals for said capacitor assembly through said housing;
   first and second fixed interleaved capacitor plate sets each electrically connected within said housing to a corresponding one of said terminals, said first and second plate sets substantially occupying the interior of said housing except for a central core volume therein extending between said opposite end walls;
   trimmer capacitor means within said central core volume, said trimmer capacitor comprising a third fixed set of capacitor plates and a movable fourth set of plates interleaved therewith;
   and second means including a generally elongated axially flexible wall member attached on one end to said fourth plate set and on the other end to and forming a portion of said housing end wall adjacent to the end of said central core and opposite said third set of capacitor plates, and a mechanical thrust adjustment operatively associated with said flexible wall member, said thrust member being arranged to position said fourth plate set, said thrust adjustment thereby deflecting said flexible wall member, said trimmer being thereby effectively electrically connected in parallel with the capacitor provided by said first and second plate sets.

2. Apparatus according to claim 1 in which said flexible wall member is a bellows of conductive material.

3. Apparatus according to claim 2 in which said bellows is formed of resilient metal and extends axially into said housing, and said mechanical thrust adjustment is a lead screw operative to position said third capacitor plate set with respect to said housing end wall to which said bellows is attached, thereby to control the extent of the interleaving of said third and fourth plates sets and therefore the amount of capacitance provided by said trimmer capacitor means.

4. Apparatus according to claim 3 in which said third and fourth plate sets are defined as having axial dimensions small compared to the axial dimensions of said first and second plates sets, said axial dimensions being measurable substantially normal to said housing end walls.

5. A hermetically sealed capacitor assembly providing capacitance adjustment over a fraction of the total maximum capacitance, comprising:
 a vacuum-tight enclosure including first and second opposite conductive end-bells and a centrally disposed insulating body member sealed thereto;
 first and second sets of interleaved capacitor plates, each of said sets extending from and each being electrically connected to the inside surface of a corresponding one of said first and second end-bells, said first and second plate sets substantially occupying the space within said housing except for an axially extending central volume about the axial centerline of said enclosure;
 third and fourth sets of interleaved capacitor plates within said axially extending central volume, said third and fourth plate sets having axially lengths small compared to the axial length of said first and second plate sets, said third plate set extending from and being electrically connected to the inside surface of said first end-bell;
 adjustment means attached to said fourth plate set for determining the axial position of said fourth plate set and therefore the extend of interleaving with said third plate set;
 and flexible vacuum tight means associated with said adjustment means to transmit axial motion to said third plate set, said flexible means also being arranged to provide electrical continuity between said third plate sets and said second end-bell.

6. Apparatus according to claim 5 in which said adjustment means comprises a lead screw operative to position said third plate set axially with respect to said second end-bell.

7. Apparatus according to claim 1, further defined in that said end walls of said housing comprise a pair of conductive end-bells and an insulating sleeve attached to and spaced between said end-bells to form said housing.

8. Apparauts according to claim 7 in which said end-bells comprise said terminals of said first means.

* * * * *